3,402,241
CONTROL OF PLANT FUNGAL AND BAC-
TERIAL DISEASES WITH 2,3-DIHYDRO-5-
CARBOXIMIDO-6-METHYL-1,4-OXATHIIN,
MONO- AND DI-OXIDES
Bogislav Von Schmeling, Hamden, New Haven, Conn.,
and Marshall Kulka, Dalel Singh Thiara, and William
A. Harrison, Guelph, Ontario, Canada, assignors to
Uniroyal, Inc., a corporation of New Jersey
No Drawing. Filed Nov. 5, 1965, Ser. No. 506,606
10 Claims. (Cl. 424—248)

ABSTRACT OF THE DISCLOSURE

Control of fungus diseases of plants (e.g., bean rust, post-emergence damping-off, tomato early blight) is effected by application of 2,3 - dihydro - 5 - carboxamido-6-methyl-1,4-oxathiin-4-sulfoxides or -4,4-sulfones of the formula

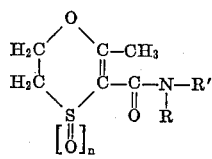

where R is alkyl, aryl, etc., R' is hydrogen, alkyl, etc., and $n$ is 1 or 2. An example is 2,3-dihydro-5-carbox-anilido-6-methyl-1,4-oxathiin-4,4-dioxide.

---

This invention relates to the control of plant diseases caused by microorganisms such as plant pathogenic fungi.

We have found that certain carboxamido oxathiin oxides are effective biocides, especially systemic fungicides and bactericides.

The chemicals employed as new agriculturally useful biocides, in particular systemic fungicides and bactericides, have the general formula:

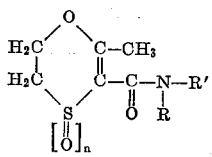

where R may be alkyl, alkenyl, cycloalkyl, aryl, or heterocyclic, including substituted bodies of this kind such as substituted aryl; R' may be hydrogen, alkyl (including substituted alkyl), or a bivalent linking group (e.g., methylene) having two of the described carboxamido oxathiin oxide bodies attached thereto form a bis compound; R and R' may be joined together to form a cyclic structure; and $n$ is 1 or 2.

The chemicals may be termed 2,3-dihydro-5-carboxamido-6-methyl-1,4-oxathiin sulfoxides (or 2,3-dihydro-5-carboxamido - 6-methyl - 1,4 - oxathiin - 4 - oxides) when $n=1$, and 2,3 - dihydro-5-carboxamido-6-methyl-1,4-oxathiin sulfones (or 2,3-dihydro-5-carboxamido-6-methyl-1,4-oxathiin-4,4-dioxides) when $n=2$.

The chemicals per se are claimed in copending application Ser. No. 506,596 of Marshall Kulka et al., filed of even date herewith.

The chemicals are effective seed and soil fungicides, especially for protecting seeds and seedings from pre-emergence and post-emergence damping-off caused by plant pathogenic soil organisms, and are effective bactericides. The chemicals possess a broad spectrum controlling effect against such soil pathogens as *Uromyces phaseoli typica* Arth. and *Rhizoctonia solani* Kühn without injury to crops. The chemicals are also bactericides controlling such economically important bacteria as *Staphylococcus aureus* Rosenbach, and otherwise useful as foliage bactericides. The systemic activity of the chemicals is of particular interest in connection with the control of internal plant diseases such as the Dutch elm disease and cereal smut and rust.

Particularly interesting chemicals for use in the invention are those in which R' is hydrogen in the formula given above, although R' may also be alkyl, especially lower alkyl (e.g. methyl, ethyl, butyl) including substituted alkyl (e.g. cyanoethyl), or methylene. Preferred values for R are alkyl (e.g., methyl, ethyl, isopropyl, butyl, hexyl, dodecyl, hexadecyl), alkenyl (e.g. allyl, 2-buten-1-yl, methallyl, 1-octene-7-yl), cycloalkyl (e.g., cyclohexyl), phenyl (including substituted phenyl as represented by the formula

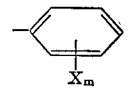

wherein X is halogen [fluorine, chlorine, bromine and iodine], alkyl [e.g. methyl, ethyl, hexyl, dodecyl], alkoxy [e.g. methoxy, ethoxy, dodecoxy], carboxamido, carboxyl, benzo [i.e. to provide a 1-naphthyl structure], phenyl, or hydroxy), or heterocyclic as in pyridyl, benzothiazyl, triazolyl, furfuryl, furyl, quinolyl, beta-thionyl-ethyl, etc., and R and R' may together form cyclic structures (as in morpholido,

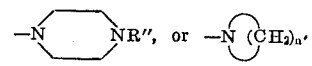

wherein R" is alkyl [e.g., methyl, butyl, dodecyl] and $n'$ is from 4 to 6).

The chemical may be applied to seeds by tumbling the chemical with the seeds, either alone or in admixture with a powdered solid carrier, to coat the seeds. Typical powdered solid carriers are the various mineral silicates, e.g. mica, talc, pyrophillite, and clays. The chemical may also be applied to the seeds in admixture with a conventional surface-active wetting agent, with or without additional powdered solid carrier, as by first wetting the mixture with a small amount of water and then tumbling the seeds in the slurry. The surface-active wetting agents that may be used with the chemical may be any of the conventional anionic, nonionic, or cationic surface-active agents. Such surface-active agents are well known and reference is made to U.S. Patent No. 2,547,724, columns 3 and 4 for detailed examples of the same. As a seed protectant, the amount of the chemical coated on the seeds will be ¼ to 12 ounces per hundred pounds of the seed. As a soil fungicide, the chemical may be applied as a dust in admixture with sand or dirt or a powdered solid carrier such as a mineral silicate, with or without an additional surface-active wetting agent, to the furrows with the planting of the seeds, or the chemical may be applied as an aqueous spray, if desired including a surface-active dispersing agent, or a surface-active dispersing agent and a powdered solid carrier, to the seed rows before, or with, or after planting the seeds. As a soil fungicide, the amount of the chemical applied to the seed rows will be from 0.1 to 10 pounds per acre applied to the seed rows the equivalent of an area 2″ wide and 2″ deep to parallel rows in one direction a distance of 40″ apart. Also, as a soil fungicide, the chemical may be applied broadcast as a similar dust or aqueous spray with an application rate of 1.0 to 100 pounds per acre. As a foilage fungicide, the chemical may be applied to growing plants at a rate of ¼ to 10 pounds per acre. Such application is generally as an aqueous spray which also contains a surface-active dispersing agent, or a surface-active dispersing agent and a powdered solid carrier.

The 2,3-dihydro-5-carboxamido-6-methyl-1,4-oxathiin sulfoxides and sulfones employed in the invention may be prepared by oxidation of 2,3-dihydro-5-carboxamido-6-methyl-1,4-oxathiins, as described in detail in copending application Ser. No. 506,596 referred to previously. The intermediate 2,3-dihydro-5-carboxamido - 6 - methyl-1,4-oxathiins used to prepare the sulfoxides and sulfones may in turn be made by the methods disclosed in copending application Ser. No. 451,048 of Marshall Kulka et al., filed Apr. 26, 1965. One method of preparing the 2,3-dihydro-5-carboxamido-6-methyl-1,4-oxathiin intermediate, represented by the following equations, involves providing the appropriate known alphachloroacetoacetamide (III) (which may in turn be prepared in accordance with conventional practice, for example, by chlorination of the acetoacetamide (II) with sulfuryl chloride in benzene), and then reacting III with 2-mercaptoethanol (IV) under basic conditions. (It will be understood that alphabromo-acetoacetamide may be used instead.) The reaction proceeds through two intermediates V and VI, neither of which need be isolated:

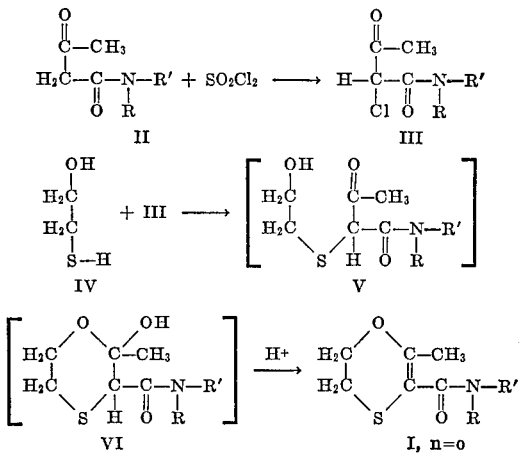

The reaction between III and IV, in the presence of a base, whether an inorganic base (e.g. alkali metal hydroxide, carbonate, or bicarbonate) or an organic base (e.g. pyridine or N,N'-dimethylaniline), proceeds readily at ambient temperatures. The reaction is conveniently carried out in any solvent medium that is inert under the conditions of the reaction, such as water, alcohol, (e.g. methanol, ethanol, butanol, propanol, etc.) or other organic solvent, for example a hydrocarbon solvent, such as benzene or hexane, ether, acetone, pyridine, dioxane, etc. or a mixture of such solvents. Preferably a volatile solvent is used to facilitate recovery of the product. The reaction is exothermic, and in order to prevent an undue rise in temperature one of the reactants (conveniently in solution) may be added gradually to the other (preferably in solution). External cooling may be applied if necessary, but in any case it is not necessary to maintain any particular critical temperature range. The materials may be reacted in equimolar quantities or an excess of one of the reactants may be employed if desired. When the base employed is potassium hydroxide, potassium chloride is formed during the reaction; this precipitates (when water is not the solvent) and can be filtered off. The reaction mixture at this stage contains the intermediate V or VI or both. Although the intermediates can be recovered by evaporating the solvent, this is not necessary. The intermediate V cyclizes readily to VI under slightly acid condition. The intermediate VI is readily dehydrated to yield the product I. This is conveniently accomplished by acidification of the solution, for example with a small quantity of organic acid (e.g. para-toluenesulfonic acid, benzenesulfonic acid, p-chlorobenzenesulfonic acid, etc.) or inorganic acid (e.g. hydrochloric acid). The dehydration is facilitated by heating, and particularly by heating under reflux conditions to drive off the water formed, conveniently as an azeotrope with benzene or the like from which the water can be separated before returning the reflux. Many possible variations in the procedure will be apparent to those skilled in the art.

Alternatively the synthesis may be carried out in one pot. After the chlorination is complete, the hydrogen chloride and sulfur dioxide are blown out with air and then the resulting suspension of the alpha-chloroacetoacetamide (III) in benzene is directly treated with 2-mercaptoethanol as above.

A second method for the preparation of the intermediate product I involves ring formation first and then the amide function adjustment, as represented in the equations below. An alkyl acetoacetate such as ethyl acetoacetate (VII) (or equivalent, such as any lower alkyl [1–4C atoms] acetoacetate) is chlorinated with sulfuryl chloride to form the known ethyl alpha-chloroacetoacetate (VIII). (It will be understood that other halogens, e.g. bromine, are also suitable). The ethyl alpha-chloroacetoacetate (VIII) is treated with 2-mercaptoethanol (IV) in the presence of a base in a manner analogous to the first method described above, causing the formation of two intermediates IX and X, which need not be isolated. Instead the intermediates are cyclized and dehydrated by the action of acid as in the first method, conveniently by heating under reflux in a benzene solution thus removing the water azeotropically to give XI. This ester (XI) is then hydrolized to 2,3-dihydro-6-methyl-1,4-oxathiin-5-carboxylic acid (XII) by boiling a short time with aqueous alkali. The acid XII is converted to the acid chloride XIII by means of thionyl chloride (or equivalent halogenating agent), and the amide I is then obtained from XIII by adding an amine. The acid chloride XIII will react with any primary or secondary amine (including hydrazine or ammonia) without limitation to formamide I. ($n=0$)

The first method which is the more direct method is more sensitive to side reactions and the yields of I obtained by such method may be lower. Equations representing the second method are as follows:

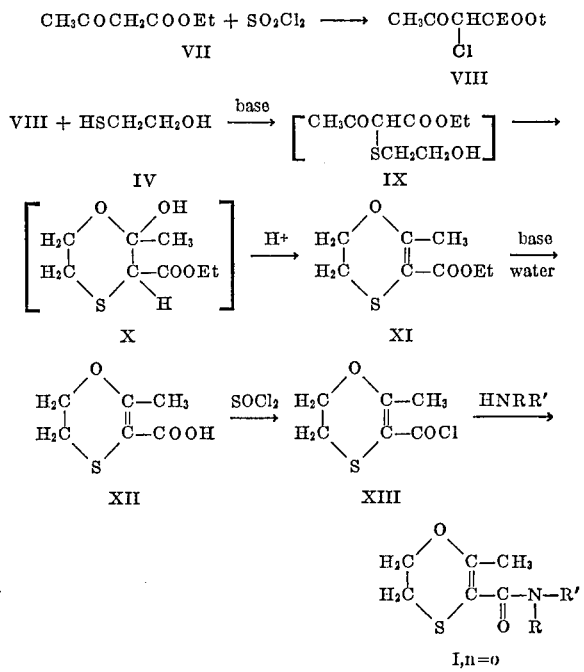

Having thus obtained the appropriate 2,3-dihydro-5-carboxamido-6-methyl-1,4-oxathiin, conversion to the desired sulfoxide or sulfone is, as indicated, effected by oxidation.

Thus, the sulfoxide may be prepared by dissolving the 2,3 - dihydro - 5 - carboxamido - 6 - methyl - 1,4 - oxathiin in a suitable solvent such as acetic acid, acetone, etc., or mixtures thereof, and treating the solution with one mole of 30% hydrogen peroxide (concentration of 15 to 30% may be used) keeping the temperature at 0° to 25° C., preferably at 10° C. The sulfoxide is recovered from the reaction mixture by removal of the solvent and crystallization of the residue.

The sulfone may be prepared by dissolving the 2,3-dihydro - 5 - carboxamido - 6 - methyl - 1,4 - oxathiin in a suitable solvent such as acetic acid, acetone, etc., or mixtures thereof, and treating the solution with 2 to 3 moles of 30% hydrogen peroxide at temperatures of 45° to 95° C. Preferably the solution is treated with 30% hydrogen peroxide at a temperature of 45 to 50° C. first and when the exothermic reaction subsides the reaction mixture is heated at 70–90° C. The sulfone is recovered by dilution of the reaction mixture with water and crystallization of the precipitate.

The sulfone may also if desired be prepared from the sulfoxide by oxidation with hydrogen peroxide.

The following preparations are illustrative.

PREPARATION A.—2,3 - DIHYDRO - 5 - CARBOXANILIDO - 6 - METHYL - 1,4 - OXATHIIN - 4- OXIDE (ALSO CALLED 2,3 - DIHYDRO - 5 - N-PHENYLCARBOXAMIDO - 6 - METHYL - 1,4-OXATHIIN SULFOXIDE)

Part 1.—Preparation of 2,3-dihydro-5-carboxanilido-6-methyl-1,4-oxathiin (from acetoacetanilide)

Step I: Preparation of alpha-chloroacetoacetanilide.—To a stirred suspension of acetoacetanilide (150 g., 0.845 mole) and dry benzene (one liter) is added sulfuryl chloride (72 ml. or 120 g., 0.890 mole) dropwise over a period of 1½ hours. The stirring is continued for ½ hour more. The product is filtered (the filtrate used in a second run in place of dry benzene gives a higher yield of alpha-chloroacetoacetanilide), washed with water and benzene and dried. Yield 131 g. (73.5%); M.P. 136°–138° C. [Naik, Trivedi and Mankad, J. Indian Chem. Soc., 20, 365 (1943); Bulow and King, Ann. 439,211 (1924)].

Step II: Preparation of 2,3-dihydro-5-carboxanilido-6-methyl-1,4-oxathiin using potassium hydroxide.—To a stirred suspension of alpha-chloroacetoacetanilide (63.5 g. or 0.3 mole) and dry benzene (300 ml.) is added a solution of potassium hydroxide (20.4 g.), 2-mercaptoethanol (22.2 ml. or 23.4 g., 0.3 mole) and methanol (40 ml.) dropwise over a period of two hours, keeping the temperature below 30° C. The mixture is stirred for one hour more. The potassium chloride which precipitates is filtered. The solvents are removed from the filtrate by distillation. Benzene is added to the residue and the resulting solution is then washed with water till neutral. The benzene solution is acidified with p-toluenesulfonic acid (0.8 g.) and heated under reflux using a Dean-Stark trap to collect water. The water collected is 5 ml. (theory 5.4 ml.). The solution is washed with water and the benzene removed. The residue solidifies and is crystallized from 95% ethanol. Yield 45.8 g. (65%); M.P. 93–95° C.

Step II (Alternate); Using sodium bicarbonate in place of potassium hydroxide.—To a stirred suspension of alpha-chloroacetoacetanilide (42.3 g. or 0.2 mole) in benzene (200 ml.) and 2-mercaptoethanol (17 g.) is added a solution of sodium bicarbonate (22 g.) in water (150 ml.) portionwise in one hour. The reaction is further stirred until all the solids go into solution (½ hour). The benzene layer is separated, washed with water, acidified with p-toluenesulfonic acid (0.5 g.) and then heated under reflux, removing the water (3.5 ml.) formed by azeotropic distillation using a Dean-Stark trap. The reaction mixture is cooled, washed with water and the solvent removed. The residue is crystallized from methanol. Yield 27 g.; M.P. 93–94° C.

The mother liquors are taken to dryness but the viscous oily residue would not crystallize. This is dissolved in benzene, washed with aqueous sodium hydroxide and with water and the benzene removed. The residue solidifies quickly and is crystallized from methanol. Yield 8.5 g.; M.P. 92–93° C.; total yield 35.5 g. (75%).

Part 2.—Oxidation of the oxathiin to the sulfoxide

To a stirred solution of 2,3-dihydro-6-methyl-1,4-oxathiin-5-carboxanilide (25 g.) in acetic acid (150 ml.) and water (5 ml.) is added dropwise a solution of 30% hydrogen peroxide (12 ml.) and acetic acid (13 ml.) over 15 minutes. The temperature is maintained at 10–13° C. by cooling on ice. The solution is stirred at this temperature for 5 hours and then let stand at 10° C. overnight. The solvent is distilled off in vacuo, the last traces removed by alternate addition and removal of benzene in vacuo. The residue which solidifies on cooling and scratching is crystallized from isopropanol as white prisms melting at 120–121° C. The yield from two crops is 23.5 g. or 80%.

PREPARATION B.—2,3 - DIHYDRO - 5 - (N - 2,3 - DIMETHYLPHENYLCARBOXAMIDO) - 6 - METHYL - 1,4 - OXATHIIN - 4 - OXIDE (ALSO NAMED 2,3 - DIHYDRO - 5 - (2,3 - DIMETHYLCARBOXANILIDO) - 6 - METHYL - 1,4 - OXATHIIN SULFOXIDE)

Part 1.—Preparation of 2,3-dihydro-5-(N-2,3-dimethylphenylcarboxamido) - 6 - methyl - 1,4 - oxathiin (from ethylacetoacetate)

Step I: Preparation of ethyl alpha-chloroacetoacetate.—[Allihn, Ber., 11, 567 (1878). Boehme, W.R. Org. Syn. vol. 33, 43 (1953).]

To a stirred and cooled solution of ethyl acetoacetate (260 g. or 2 moles) is added sulfuryl chloride (270 g. or 2 moles) over 3 hours, keeping the temperature between 0° and 5° C. The reaction mixture is left overnight. The sulfur dioxide and hydrogen chloride are removed on a water pump. The residual dark liquid is distilled at reduced pressure. After a small forerun the liquid distilling between 88–90° C. (at 15 mm.) is collected. Yield 300 g. (91%).

Step II: Preparation of ethyl 2,3-dihydro-6-methyl-1,4-oxathiin-5-carboxylate.—To a cooled and stirred solution of ethyl alpha-chloroacetoacetate (33 g. or 0.2 mole) and dry benzene (200 ml.) is added a solution of potassium hydroxide (13.6 g.), 2-mercaptoethanol (15.0 ml. or 15.6 g.) and methanol (30 ml.) over a period of 1½ hours keeping the temperature below 30° C. The reaction mixture is stirred for ½ hour more. The potassium chloride formed is filtered. The solvents are removed from the filtrate. Benzene is added to the residue and then washed with water. The benzene solution is acidified with p-toluene-sulfonic acid and the water (3.4 ml.; theory 3.6 ml.) is collected by azeotropic distillation using the Dean-Stark trap. The reaction mixture is cooled, washed with water and then the benzene removed. The residue is distilled under high vacuum; B.P. (1 mm.) 107–110° C.; yield 23 g. (61.2%). This compound may also be prepared in 76% yield using sodium bicarbonate instead of potassium hydroxide.

Step III: Preparation of 2,3-dihydro-5-carboxy-6-methyl-1,4-oxathiin.—To a solution of ethyl 2,3-dihydro-6-methyl-1,4-oxathiin-5-carboxylate (188 g.) in 95% ethanol (50 ml.) is added a solution of sodium hydroxide (60 g.) in water (400 ml.). The reaction mixture is heated under reflux until the two layers become homogeneous (about ½ hour).

The solution is cooled, diluted with water and acidified with dilute hydrochloric acid. The white solid which precipitates is filtered at once, washed with water and dried in air. Yield 134 g. (85%); M.P. 178–180° C. Recrystallized material from ethanol melts at 180–181° C.

Step IV: Preparation of 2,3-dihydro-5-(2,4-dimethylcarboxanilido)-6-methyl-1,4-oxathiin.—To a suspension of 2,3-dihydro-5-carboxy-6-methyl-1,4-oxathiin XII (32 g. or 0.2 mole) in chloroform (200 ml.) is added thionyl chloride (16 ml.) and the solution is heated under reflux. Hydrogen chloride and sulfur dioxide are evolved and all the solids go into solution in two hours. The excess thionyl chloride and solvent are removed in vacuo. To the residue (XIII) dissolved in chloroform (or benzene) is added a solution of 2,3-dimethylaniline (50 g.) in chloroform (or benzene), portionwise. The amine hydrochloride which forms is filtered. The filtrate is washed with very dilute hydrochloric acid and then with water. The chloroform (or benzene) is removed and the residue solidifies at once. It is recrystallized from 95% ethanol. Yield 41 g. (77%); M.P. 101.5–103.5° C.

Part 2.—Oxidation of the oxathiin to the sulfoxide

To a stirred solution of 2,3-dihydro-6-methyl-1,4-oxathiin-5-(2,3-dimethylcarbonanilide) (12 g.) in acetic acid (125 ml.) and water (5 ml.) was added dropwise a solution of 30% hydrogen peroxide (5 ml.) in acetic acid (20 ml.) over 15 minutes. The temperature was kept at 10–12° C. by cooling during the addition. The solution was stirred at 10–12° C. for 2 hours and then allowed to stand at 10° C. overnight. The solvent was distilled off in vacuo, the last traces removed by alternate addition and removal of benzene. The residue on crystallization from isopropanol gave a white product melting at 137–138° C. The yield was 11 g. or 85%.

PREPARATION C.—2,3 - DIHYDRO - 5 - CARBOXANILDO - 6 - METHYL - 1,4 - OXATHIIN - 4,4 - diOXIDE (ALSO CALLED 2,3 - DIHYDRO - 5 - N-PHENYLCARBOXAMIDO - 6 - METHYL - 1,4-OXATHIIN SULFONE)

Part 1.—2,3 - dihydro - 5 - carboxanilido - 6 - methyl-1,4-oxathiin may be prepared as in Preparation A or Preparation B Part 2.—Oxidation of the oxathiin to the sulfone (also called dioxide)

To a stirred solution of 2,3-dihydro-5-carboxanilido-6-methyl-1,4-oxathiin (117.5 g., 0.5 mole) in acetic acid (400 ml.) is added 30% hydrogen peroxide (130 ml.) dropwise keeping the temperature of the reaction mixture at 45–50° C. by cooling on ice. After the exothermic reaction has subsided the reaction mixture is heated gently on the steam bath for one hour making sure that the temperature does not rise above 92° C. The reaction mixture is allowed to cool, diluted with 200 ml. of water and the white crystals which separate are filtered, washed and dried, M.P. 126–128° C. The yield is 61 g. The filtrate on concentration yields 60 grams more of the sulfone melting at 125–127° C. The total yield is 121 g. or 90%. Recrystallization from ethanol raises the melting point to 128–130° C.

An alternate version of Part 2 of this preparation, using less solvent, is as follows:

A mixture of 2,3-dihydro-5-carboxanilido-6-methyl-1,4-oxathiin (235 g., 1 mole) and glacial acetic acid (90 ml.) is heated to form a slurry and then cooled to 70° C. To this stirred slurry is added dropwise 30% hydrogen peroxide (250 ml.) over a period of one hour. The reaction mixture which soon becomes a solution is kept at a temperature of 70–75° C. by cooling during the addition of the first half of the peroxide and by warming during the addition of the second half of the peroxide. Then the light-colored solution is stirred and heated at 70–75° C. for 5 hours and finally at 90–95° C. for one hour. On cooling the sulfone crystallizes out from the solution as white prisms melting at 127–128° C. The yield is 223 g. or 84%.

PREPARATION D.—2,3-DIHYDRO-5-(N-m-TOLYLCARBOXAMIDO) - 6 - METHYL-1,4-OXATHIIN-4,4-DIOXIDE (ALSO CALLED 2,3-DIHYDRO-5-(m-METHYLCARBOXANILIDO)-6-METHYL - 1,4-OXATHIIN SULFONE)

Part 1.—Preparation of 2,3-dihydro-5-(m-methyl-carboxanilido)-6-methyl-1,4-oxathiin Part one of Preparation A or Preparation B may be repeated, using m-toluidine as the amine. The product may be obtained in 46% (method of Preparation A) to 75% (method of Preparation B) yield, M.P. 83–85° C. after crystallization from methyl alcohol.

Part 2.—Oxidation of the oxathiin to the dioxide (sulfone); 2,3-dihydro-6-methyl-5-m-methylcarboxanilido-1,4-oxathiin-4,4-dioxide To a solution of 2,3-dihydro-6-methyl-5-m-methylcarboxanilido-1,4-oxathiin (24.6 g. or 1/10 mole) and acetic acid (70 ml.) is added 30% hydrogen peroxide (30 ml.) portionwise keeping the temperature at 30–50° C. by cooling with water. After the addition of hydrogen peroxide is complete the reaction flask is heated on a steam bath at 80–90° C. for one hour. It is cooled and diluted with cold water (100 ml.). The white material which precipitates is filtered and air dried. Yield=23 g.; M.P.=128–130° C. The filtrate on concentration by heating on the steam bath gives 2 g. more of product. Total yield is 25 g. or 90%. Crystallization from ethanol raises the melting point to 133–135° C.

PREPARATION E.—2,3-DIHYDRO - 5 - N-CYCLOHEXYLCARBOXAMIDO - 6 - METHYL-1,4-OXATHIIN-4,4-DIOXIDE (ALSO CALLED 2,3-DIHYDRO - 5 - N - CYCLOHEXYLCARBOXAMIDO-6-METHYL-1,4-OXATHIIN SULFONE)

Part 1.—Preparation of 2,3-dihydro-5-N-cyclohexylcarboxamido-6-methyl-1,4-oxathiin Part one of Preparation A or Preparation B may be repeated, using cyclohexylamine as the amine. The product may be obtained in 77% yield, M.P. 127–128° C.

Part 2—Oxidation of the oxathiin to the dioxide (sulfone); 2,3-dihydro - 6 - methyl-5-N-cyclohexylcarboxamido-1,4-oxathiin-4,4-dioxide To a cooled solution of 2,3-dihydro-6-methyl-5-N-cyclohexylcarboxamido-1,4-oxathiin (23.9 g. or 1/10 mole) and acetic acid (125 ml.) is added 30% hydrogen peroxide (30 ml.) portionwise. During the addition of hydrogen peroxide the temperature rises to 65° C. It is cooled down to 40° C. before the addition of rest of the hydrogen peroxide. After the addition is complete, the reaction mixture is heated on the steam bath for one hour. It is cooled (some white needle-like crystals appear), diluted with cold water (100 ml.), and the white precipitate is filtered and washed with water. The product weighs 21.6 g. (80%) and melts at 182–4° C.

The following Table I summarizes the foregoing preparations, and other products which may be made in the same manner for use in the invention.

TABLE I.—TABLE OF SULFOXIDES AND SULFONES (4-OXIDES OR 4,4-DIOXIDES)

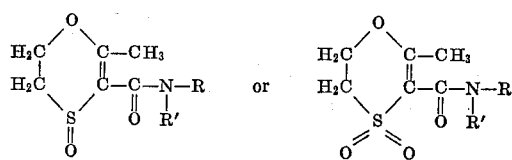

(R'=H unless otherwise indicated)

PART A—SULFOXIDES

| Product | Name of 5-substituent | Parent Amine | R | M.P., °C. | Yield, percent |
|---|---|---|---|---|---|
| A | Carboxanilido | Aniline | $C_6H_5$ | 121–122 | 80 |
| B | 2,3-dimethylcarboxanilido | 2,3-dimethylaniline | 2,3-$(CH_3)_2$-$C_6H_3$ | 136–137 | 85 |
| F | m-Methylcarboxanilido | m-Toluidine | m-Tolyl | 196–198d | 85 |
| G | N-cyclohexylcarboxamido | Cyclohexylamine | Cyclohexyl | 140–141 | 80 |
| H | o-Ethylcarboxanilido | o-Ethylaniline | o-Ethylphenyl | 106–108 | 80 |
| I | p-Methylcarboxanilido | p-Toluidine | p-Tolyl | 149–150 | 83 |
| J | 2,4-dimethylcarboxanilido | 2,4-dimethylaniline | 2,4-dimethylphenyl | 121–122 | 72 |
| K | o-Methylcarboxanilido | o-Toluidine | o-Tolyl | 121–123 | 88 |
| L | 2-chlorocarboxanilido | 2-chloroaniline | 2-chlorophenyl | 143–144 | 82 |
| M | N-methylcarboxanilido | N-methylaniline | Phenyl (R'=methyl) | 168–170d | 83 |
| N | N-(t-butyl)carboxamido | t-Butylamine | t-Butyl | 153–154 | 79 |
| O | N-(n-dodecyl)carboxamido | n-Dodecylamine | n-Dodecyl | 79–81 | 75 |
| P | 2,3-dichlorocarboxanilido | 2,3-dichloroaniline | 2,3-dichlorophenyl | 177–178d | 99 |
| Q | 3-methoxycarboxanilido | 3-methoxyaniline | 3-methoxyphenyl | 155–157 | 82 |
| R | Carboxymorpholido | Morpholine | R and R' together= ⌬O | 104–106 | 65 |
| S | p-Carboxycarboxanilido | p-Carboxyaniline | 4-carboxyphenyl | 230–235d | 84 |
| T | 3,4-dimethoxycarboxanilido | 3,4-dimethoxyaniline | 3,4-$(CH_3O)_2$-$C_6H_3$ | 188–190d | 75 |
| BF | N-isopropylcarboxamido | Isopropylamine | Isopropyl | 121–122 | 74 |
| BG | N-ethylcarboxanilido | N-ethylaniline | R=phenyl; R'=ethyl | 112–113 | 50 |

PART B—SULFONES

| Product | Name of 5-substituent | Parent Amine | R | M.P., °C. | Yield, percent |
|---|---|---|---|---|---|
| C | Carboxanilido | Aniline | $C_6H_5$ | 128–130 | 90 |
| D | m-Methylcarboxanilido | m-Toluidine | m-$CH_3$-$C_6H_4$ | 133–135 | 90 |
| E | N-cyclohexylcarboxamido | Cyclohexylamine | -$C_6H_{11}$ | 182–184 | 80 |
| U | o-Methylcarboxanilido | o-Toluidine | o-Tolyl | 123–125 | 85 |
| V | p-Methylcarboxanilido | p-Toluidine | p-Tolyl | 163–165 | 87 |
| W | 2,3-dimethylcarboxanilido | 2,3-dimethylaniline | 2,3-dimethylphenyl | 151–153 | 44 |
| X | 2-ethylcarboxanilido | 2-ethylaniline | 2-ethylphenyl | 106 | 85 |
| Y | 3-methoxycarboxanilido | 3-methoxyaniline | 3-methoxyphenyl | 150–152 | 86 |
| Z | 4-methoxycarboxanilido | 4-methoxyaniline | 4-methoxyphenyl | 137–138 | 90 |
| AA | 3-bromocarboxanilido | 3-bromoaniline | 3-bromophenyl | 138–140 | 80 |
| AB | 3-chloro-2-methylcarboxanilido | 3-chloro-2-methylaniline | 3-chloro-2-methylphenyl | 152–154 | 78 |
| AC | 2-methoxycarboxanilido | 2-methoxyaniline | 2-methoxyphenyl | 186 | 70 |
| AD | 3-chlorocarboxanilido | 3-chloroaniline | 3-chlorophenyl | 180–183d | 68 |
| AE | 2,4,5-trichlorocarboxanilido | 2,4,5-trichloroaniline | 2,4,5-trichlorophenyl | 210–211d | 69 |
| AF | N-n-butylcarboxamido | n-Butylamine | n-Butyl | 156–157 | 75 |
| AG | N-n-octylcarboxamido | n-Octylamine | n-Octyl | 140 | 80 |
| AH | 2,4-dimethylcarboxanilido | 2,4-dimethylaniline | 2,4-dimethylphenyl | 144–146 | 75 |
| AI | 2,5-dimethylcarboxanilido | 2,5-dimethylaniline | 2,5-dimethylphenyl | 130–133 | 83 |
| AJ | 3,4-dichlorocarboxanilido | 3,4-dichloroaniline | 3,4-dichlorophenyl | 160–162 | 48 |
| AK | 2-methyl-4-methoxycarboxanilido | 2-methyl-4-methoxyaniline | 2-methyl-4-methoxyphenyl | 133–136 | 60 |
| AL | 2-chloro-6-methylcarboxanilido | 2-chloro-6-methylaniline | 2-chloro-6-methylphenyl | 163–165 | 50 |
| AM | N-methylcarboxanilido | N-methylaniline | Phenyl (R'=methyl) | 126 | 92 |
| AN | N-n-pentylcarboxamido | n-Pentylamine | n-Pentyl | 154–156 | 90 |
| AO | N-n-hexylcarboxamido | n-Hexylamine | n-Hexyl | 150 | 85 |
| AP | N-isopropylcarboxamido | Isopropylamine | Isopropyl | 149–151 | 74 |
| AQ | N-ethylcarboxanilido | N-ethylaniline | Phenyl (R'=ethyl) | 125–126 | 83 |
| AR | N-octadecylcarboxamido | Octadecylamine | Octadecyl | 122–123 | 80 |
| AS | 2-chlorocarboxanilido | 2-chloroaniline | 2-chlorophenyl | 173–174 | 91 |
| AT | 4-bromocarboxanilido | 4-bromoaniline | 4-bromophenyl | 215 | 95 |
| AU | 2,3-dichlorocarboxanilido | 2,3-dichloroaniline | 2,3-dichlorophenyl | 159–161d | 65 |
| AV | 2,5-dichlorocarboxanilido | 2,5-dichloroaniline | 2,5-dichlorophenyl | 178–179d | 68 |
| AW | 3,5-dichlorocarboxanilido | 3,5-dichloroaniline | 3,5-dichlorophenyl | 213–214d | 59 |
| AX | N(n-decyl)carboxamido | n-Decylamine | n-Decyl | 118 | 69 |
| AY | N(n-dodecyl)carboxamido | n-Dodecylamine | n-Dodecyl | 131–132 | 75 |
| AZ | 4-chlorocarboxanilido | 4-chloroaniline | 4-chlorophenyl | 217–219 | 95 |
| BA | 2-carboxamidocarboxanilido | 2-carboxamidoaniline | 2-carboxamido | 207–208d | 34 |
| BB | Carboxymorpholido | Morpholine | R and R¹ together= ⌬O | 226–227d | 96 |
| BC | N-cyanoethylcarboxanilido | N-cyanoethylaniline | Phenyl (R¹=cyanoethyl) | 122–123 | 75 |
| BD | N-benzylcarboxamido | Benzylamine | $C_6H_5CH_2$- | 152–153 | 89 |
| BE | 3,4-dimethoxycarboxanilido | 3,4-dimethoxyaniline | 3,4-$(CH_3O)_2$-$C_6H_3$ | 183–185 | 82 |
| BH | N-hexadecylcarboxamido | n-Hexadecylamine | $C_{16}H_{35}$ | 125–126 | 83 |
| BI | 2-methyl-4-chlorocarboxanilido | 2-methyl-4-chloroaniline | 2-$CH_3$-4-Cl-$C_6H_3$- | 169–170 | 93 |
| BJ | 3-chloro-4-methylcarboxanilido | 3-chloro-4-methylaniline | 3-Cl-4-$CH_3$-$C_6H_3$- | 159–160 | 84 |
| BK | 2-methoxy-5-chlorocarboxanilido | 2-methoxy-5-chloroaniline | 2-$CH_3O$-5-Cl-$C_6H_3$- | 153–155 | 89 |
| BL | N,N-diethylcarboxamido | Diethylamine | R=ethyl; R'=ethyl | | 90 |
| BM | N,N-dibutylcarboxamido | Dibutylamine | R=butyl; R'=butyl | | 75 |
| BN | 2,5-dimethoxy-4-chlorocarboxanilido | 2,5-dimethoxy-4-chloroaniline | 2,5-$CH_3O$-4-Cl-$C_6H_2$ | 202–204 | |

The following examples illustrate the invention. All parts and percentages are by weight.

EXAMPLE 1

The ability to control plant diseases which are already established in the plants was evaluated by employing the following testing technique.

Two hundred milligrams of the chemical are dissolved in 20 ml. of acetone and 60 mg. of a surfactant such as Tween–20, which is polyoxyethylene sorbitan monolaurate. This preparation is diluted with 80 ml. distilled water giving a chemical suspension of 2000 p.p.m. Further serial dilutions are prepared as desired. The chemical suspensions are sprayed on duplicate pots, each containing three snapbean plants which had, 48 hours prior to this, been inoculated with bean rust *Uromyces phaseoli typica* Arth. The spray application is made with a gun-type sprayer delivering 2.5 ml. per second. At the time of the chemical spray the bean plants have just begun to expand their first trifoliate leaves. The test plants are then placed in a control chamber for 24 hours at 75° F. and 100% relative humidity. After this time the plants are returned to the greenhouse. About 10 days later the plants are scored for disease control.

The results are shown in the following Table II, for various 2,3 - dihydro-5-carboxamido-6-methyl-1,4-oxathiin sulfones and sulfoxides having the structural formula set forth above, in which R' is hydrogen unless otherwise indicated in the table and R has the value indicated in the table.

TABLE II.—THE SYSTEMIC FUNGICIDAL EFFECT OF OXIDATION PRODUCTS OF CARBOXAMIDO OXATHIIN DERIVATIVES AS MEASURED BY THEIR ABILITY TO CONTROL THE BEAN RUST DISEASE

A. SULFONES

| Preparation | Value of R | P.p.m. | Percent Control |
|---|---|---|---|
| C | 2,3-dihydro-5-carboxanilido-6-methyl-1,4-oxathiin-4,4-dioxide. | 50 | 30 |
| | | 125 | 95 |
| | | 500 | 100 |
| U | o-Tolyl | 30 | 0 |
| | | 125 | 40 |
| | | 500 | 100 |
| D | m-Tolyl | 30 | 20 |
| | | 125 | 95 |
| | | 500 | 100 |
| V | p-Tolyl | 500 | 20 |
| | | 2,000 | 85 |
| W | 2,3-dimethylphenyl | 20 | 0 |
| | | 125 | 95 |
| | | 500 | 100 |
| X | 2-ethylphenyl | 125 | 0 |
| | | 500 | 30 |
| | | 2,000 | 75 |
| Y | 3-methoxyphenyl | 125 | 40 |
| | | 500 | 80 |
| | | 2,000 | 90 |
| Z | 4-methoxyphenyl | 500 | 70 |
| | | 2,000 | 90 |
| AA | 3-bromophenyl | 125 | 50 |
| | | 500 | 75 |
| | | 2,000 | 100 |
| AB | 3-chloro-2-methylphenyl | 500 | 30 |
| | | 2,000 | 100 |
| E | Cyclohexyl | 30 | 0 |
| | | 125 | 80 |
| | | 500 | 98 |
| | | 2,000 | 100 |
| AI | 2,5-dimethylphenyl | 500 | 40 |
| | | 2,000 | 95 |
| AK | 2-methyl-4-methoxyphenyl | 500 | 90 |
| | | 2,000 | 95 |
| AP | Isopropyl | 2,000 | 50 |
| AQ | Phenyl (R'=ethyl) | 500 | 30 |
| | | 2,000 | 100 |

B. SULFOXIDES

| Preparation | Value of R | P.p.m. | Percent Control |
|---|---|---|---|
| F | m-Tolyl | 125 | 30 |
| | | 500 | 80 |
| | | 2,000 | 85 |
| B | 2,3-dimethylphenyl | 125 | 0 |
| | | 500 | 40 |
| | | 2,000 | 100 |
| G | Cyclohexyl | 500 | 20 |
| | | 2,000 | 100 |
| A | Phenyl | 2,000 | 90 |
| L | 2-chlorophenyl | 2,000 | 50 |

The foregoing example shows that several compounds of this invention are effective chemotherapeutic agents, the most effective members of this series being 2,3-dihydro-5-carboxanilido-6-methyl-1,4-oxathiin-4,4-dioxide (Preparation C) and 2,3-dihydro-5-N-m-methylcarboxanilido-6-methyl-1,4-oxathiin-4,4-dioxide (Preparation D).

EXAMPLE 2

This example shows a seed treatment test designed to investigate the systemic fungicidal effect of the compounds of this invention using the following method:

One hundred and twenty-four milligrams chemical were applied to 100 grams snap bean seed (*Phaseolus vulgaris*), this amount of chemical treatment being equivalent to an application rate of two ounces of chemical per 100 pounds of seed. The treated seed was tumbled for 45 minutes by mechanical rotation in an eight ounce glass jar. The seed was then planted in 4″ greenhouse pots using five seeds per pot, replicated five times, giving a total of 25 seeds per treatment. The test was conducted in a dosage series including snapbean seeds which had not been chemically treated as untreated controls. After planting the seeds the test was transferred to the greenhouse using subirrigation for watering the pots and allowing the seeds to germinate. After seven days the plants which had expanded their primary leaves were inoculated with bean rust spores and incubated for 24 hours at 75° F. and 100% relative humidity. The plants were then returned to the greenhouse and regularly watered by subirrigation. Eleven days later the plants were examined for development of the bean rust disease and compared with the untreated control plants. The results were as shown in the following Table III.

TABLE III.—CONTROL OF BEAN RUST BY SEED TREATMENT. PLANTS INOCULATED WITH RUST SPORES SEVEN DAYS AFTER PLANTING

| Preparation | Chemical Name | Oz./100 | Percent Control |
|---|---|---|---|
| Untreated check | | | 0 |
| C | 2,3-dihydro-5-carboxanilido-6-methyl-1,4-oxathiin-4,4-dioxide. | 2 | 98 |
| | | 4 | 100 |
| | | 8 | 100 |

This test shows a seed treatment test as described in Example 2, except that a growing period of the bean plants of 14 days was allowed between planting of the treated seed and inoculation of the foliage. At the time the inoculation of the plants with bean rust spores was made, not only had the primary leaves fully expanded but also the first set of trifoliate leaves had developed. The results were taken eight days after inoculation of the plants by comparing the treatments with an untreated check. The results were as follows:

TABLE IV.—CONTROL OF BEAN RUST BY SEED TREATMENT. PLANTS INOCULATED WITH RUST SPORES FOURTEEN DAYS AFTER PLANTING

| Preparation | Chemical Name | Oz./100 | Percent Control Primary Leaves | Percent Control Trifoliates |
|---|---|---|---|---|
| Untreated check | | | 0 | 0 |
| C | 2,3-dihydro-5-carboxanilido-6-methyl-1,4-oxathiin-4,4-dioxide. | 2 | 75 | 50 |
| | | 4 | 99 | 96 |
| | | 8 | 100 | 100 |

The results listed in Tables II and III show that the chemical was effectively translocated from the seed to the foliage giving rust control on the bean leaves by systemic action.

EXAMPLE 4

This example evaluates chemicals of this invention when used as soil treatments for their ability to control the foliar bean rust disease.

Thirty-three milligrams of the chemical were thoroughly mixed in a glass jar with one pound of clean, dry sand. This masterbatch was then mixed with 6¼ pounds of steam sterilized soil to give a 10 p.p.m. concentration of chemical in the soil-sand mixture. The treated soil was then placed into five 4" pots in which five snapbean seeds per pot were planted. Five replications were used giving a total of 25 seeds per treatment. An untreated check, i.e., 5 snapbean seeds per 4" pot planted in soil which had not been chemically treated, replicated five times, was included in the test. The pots were transferred to the greenhouse and kept moist by subirrigation. Seven days or 14 days (as indicated in Tables V and VI) later at the time the primary leaves were fully expanded the plants were inoculated with bean rust spores as described in Example 2. The results were taken 10 days after the inoculation had been made by inspecting the bean foliage for bean rust symptoms and comparing the plants grown in treated soil with those grown in untreated soil. The results were as follows:

TABLE V.—CONTROL OF BEAN RUST BY SOIL TREATMENT. PLANTS INOCULATED WITH RUST SPORES SEVEN DAYS AFTER PLANTING.

| Preparation | Chemical Name | P.p.m. | Percent Control |
|---|---|---|---|
| Untreated check | | | 0 |
| C | 2,3-dihydro-5-carboxanilido-6-methyl-1,4-oxathiin-4,4-dioxide. | 5 | 100 |
| | | 10 | 100 |
| | | 20 | 100 |

TABLE VI.—CONTROL OF BEAN RUST BY SOIL TREATMENT. PLANTS INOCULATED WITH RUST SPORES FOURTEEN DAYS AFTER PLANTING.

| Preparation | Chemical Name | P.p.m. | Primary leaves | Trifoliates |
|---|---|---|---|---|
| Untreated check | | | 0 | 0 |
| C | 2,3-dihydro-5-carboxanilido-6-methyl-1,4-oxathiin-4,4-dioxide. | 5 | 100 | 100 |
| | | 10 | 100 | 100 |
| | | 20 | 100 | 100 |

The results show that the chemical controlled the bean rust disease when used as a soil treatment.

EXAMPLE 5

This example evaluates chemicals of this invention as soil fungicides for their effectiveness in controlling soil-borne plant seedling diseases such as post-emergence damping-off of cotton seedlings caused by *Rhizoctonia solani* Kühn.

The test method used was as follows:

Sixty-six mg. of the chemical was thoroughly mixed in glass jar with one pound of clean, dry sand. The mixing was accomplished by vigorously shaking the jar which was covered with a screwcap. This masterbatch was then thoroughly mixed with 6¼ pounds of soil to give a 20 p.p.m. (parts per million) concentration of chemical in he soil-sand mixture. The treated soil was then placed into five 4" diameter pots in which 5 cotton seeds, Variety Fox-4, per pot were planted. Before covering the planted seeds the pots were inoculated by placing a grain of oats, infested with *Rhizoctonia solani* Kühn from a two-week-old culture, in the center of each pot surrounded by the cotton seed. The seed and the inoculum were then covered with a layer of soil about ½" thick. Five replications were used giving a total of 25 seeds for each chemical treatment. An untreated check, replicated five times, in which seeds were planted and the inoculum of *Rhizoctonia solani* was placed on the soil on the center of the 4" pot but without the chemical treatment, was included in the test. Also a check, replicated five times, was included where seeds were planted in soil without chemical treatment and without the inoculum of the organism. After the plant was completed the pots were then transferred to the greenhouse, watered and kept under warm and moist conditions by using subirrigation and temperature control in maintaining 72° F. to 78° F. soil temperature. Results were taken two to three weeks later by counting the number of emerged and surviving cotton seedlings. The percent stand of cotton seedlings is calculated using the following formula:

$$\text{Percent stand} = \frac{\text{number of seedlings surviving}}{\text{number of seedlings emerged}} \times 100$$

The following Table VII gives the percent emergence and percent stand of cotton seedlings for chemical treatment with the chemicals listed at a concentration of 20 p.p.m. (except in several specifically indicated cases where a concentration of 40 p.p.m. was used), which is equivalent to an application rate of 0.6 pound/acre (1.2 pounds/acre at 40 p.p.m.) of the chemicals applied to the seed rows the equivalent of an area 2" wide and 2" deep to parallel rows in one direction a distance of 40" apart as compared to the untreated inoculated and untreated, uninoculated soil checks. The chemicals tested are sulfones or sulfoxides having the structured formula previously set forth, in which R' is hydrogen unless otherwise indicated, and R has the value shown in the table.

TABLE VII.—SOIL FUNGICIDAL RESULTS OF *R. SOLANI* TEST WITH COTTON USING AN APPLICATION RATE OF 20 P.P.M. (OR 40 P.P.M. WHERE NOTED) CHEMICAL IN THE SOIL

A. SULFONES

| Prep. | R (R'=H) | Percent Emergence | Percent Stand |
|---|---|---|---|
| C | Phenyl | 60 | 52 |
| U | o-Tolyl | 84 | 76 |
| D | m-Tolyl | 92 | 92 |
| V | p-Tolyl | 80 | 64 |
| X | 2-Ethylphenyl | 92 | 76 |
| AC | 2-Methoxyphenyl | 84 | 60 |
| Y | 3-Methoxyphenyl | 92 | 60 |
| Z | 4-Methoxyphenyl | 84 | 68 |
| AD | 3-Chlorophenyl | 68 | 56 |
| AE | 2,4,5-Trichlorophenyl | 88 | 60 |
| AF | n-Butyl | 84 | 72 |
| AG | n-Octyl | 76 | 68 |
| AR | Octadecyl (40 p.p.m.) | 72 | 52 |
| AS | 2-Chlorophenyl | 72 | 60 |
| AT | 4-Bromophenyl (40 p.p.m.) | 72 | 48 |
| AU | 2,3-Dichlorophenyl (40 p.p.m.) | 72 | 48 |
| AV | 2,5-Dichlorophenyl (40 p.p.m.) | 88 | 72 |
| AW | 3,5-Dichlorophenyl | 76 | 56 |
| BD | Benzyl (40 p.p.m.) | 72 | 36 |
| BE | 3,4-Dimethoxyphenyl (40 p.p.m.) | 72 | 40 |

B. SULFOXIDES

| Prep. | R (R'=H) | Percent Emergence | Percent Stand |
|---|---|---|---|
| A | Phenyl | 64 | 48 |
| F | m-Tolyl | 84 | 60 |
| H | o-Ethylphenyl | 92 | 72 |
| M | Phenyl; R'=CH$_3$ (40 p.p.m.) | 76 | 60 |
| S | 4-Carboxyphenyl (40 p.p.m.) | 76 | 48 |
| T | 3,4-Dimethoxyphenyl (40 p.p.m.) | 80 | 60 |
| Untreated inoculated soil (check) | | 84 | 40 |
| Untreated uninoculated soil (check) | | 80 | 80 |

Table VII shows that several chemicals of this invention are effective soil fungicides preventing post-emergence damping-off of cotton seedlings.

EXAMPLE 6

This example evaluates chemicals of this invention as bactericides by the following agar plate technique:

Thirty-five mg. chemical was dissolved in 5 ml. of acetone to which was added 45 ml. of a 0.01% aqueous solution of Triton X-100 (surface-active wetting agent) which is isoctyl phenyl polyethoxy ethanol. Three ml. of this chemical preparation was pipetted into a 50 ml.

Erlenmeyer flask containing 5 ml. nutrient medium and kept liquified in a water bath at 47° C. The bacterial inoculum consisting of a spore suspension of *Staphylococcus aureus* Rosenbach was then added to this preparation at the amount of 0.25 ml. per flask. Thus the flask contained a chemical concentration of 255 p.p.m. This preparation was then poured into 2½" Petri plates and incubated at 30° C. Similar tests were made at a concentration of the chemical of 128 p.p.m. The results were taken 24 hours later by examining the plates for bacterial growth with a bacterial colony counter and comparing the chemical treatment with an untreated, inoculated check. The results are shown in the following Table VIII.

TABLE VIII.—BACTERICIDAL TEST

| Prep. | Chemical | P.p.m. | 24 Hours |
|---|---|---|---|
| C | 2,3-dihydro-5-carboxanilido-6-methyl-1,4-oxathiin-4,4-dioxide. | 225 | None. |
| Untreated inoculated check | | | Severe. |

The above results show that the compounds of this invention are effective bactericides.

The present chemicals may be used in combination with each other and/or along with other fungicides, insecticides, bactericides and the like. Thus, the present systemic fungicides can be used together with other seed treatment materials such as fungicides and insecticides. For example, chemicals of the invention may be applied to commercially treated seed, i.e., seed which has previously been treated with a mercury fungicide for the prevention of rotting.

EXAMPLE 7

This example evaluates the chemicals of the present invention as foliage fungicides by their ability to protect plants from subsequent infection by fungus diseases.

One gram of the chemical to be tested was ground with three ml. of acetone and 50 mg. of a non-ionic surface-active agent (a condensation product of an alkyl phenol and ethylene oxide). The acetone and surface-active agent are known to be inactive in the biological tests run. The mixture was diluted with water, giving suspensions containing 500 and 2000 p.p.m. of the chemical. Three suspensions were sprayed on duplicate six inch tomato plants (variety Clark's Early Special) using a gun-type sprayer which delivered 2.5 ml. per second. The plants were then placed in the greenhouse, together with untreated check plants. Twenty-four hours later the treated and untreated check plants were inoculated with a suspension of *Alternaria solani* spores by means of a 20 second spray from an atomizer sprayer (delivery rate 1 ml. per second). The plants were then kept overnight in a control chamber at a temperature of 75° F. and a 100% relative humidity. In the morning the plants were transferred to the greenhouse. Three days later the disease was scored by comparing the number of disease lesions of the treated plants with the untreated check.

The formula to determine percent control is:

$$100 - \frac{\text{Avg. No. lesions on treated plant}}{(\text{Avg. No. lesions on untreated plant} \times 100)} = \text{percent control.}$$

The following Table IX shows the results of tests with various chemicals having the structural formula previously set forth in which the values of R are as shown in the table, and R′ is hydrogen unless otherwise indicated.

TABLE IX.—TOMATO EARLY BLIGHT TEST

| 4,4-dioxides | R | Percent Disease Control at 2,000 p.p.m. |
|---|---|---|
| AX | Decyl | 64 |
| AY | n-Dodecyl | 41 |
| AZ | 4-chlorophenyl | 73 |
| BA | 2-carboxamidophenyl | 79 |
| BB | R and R′ together= 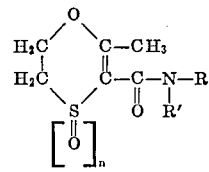 | 78 |
| BC | Phenyl, R′=cyanoethyl | 77 |
| 4-oxides | | |
| N | t-Butyl | 64 |
| O | n-Dodecyl | 39 |
| P | 2,3-dichlorophenyl | 61 |
| Q | 3-methoxyphenyl | 97 |
| R | R and R′ together= 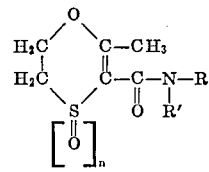 | 74 |

Having thus described our invention, what we claim and desire to protect by Letters Patent is:

1. A method of controlling fungi and bacteria which comprises applying thereto a chemical of the formula $$\begin{array}{c} H_2C \diagup O \diagdown C-CH_3 \\ H_2C \diagdown S \diagup C-C-N-R \\ [O]_n \quad \quad O \quad R' \end{array}$$

wherein R has up to 12 carbon atoms and is selected from alkyl, cycloalkyl, aralkyl, and aryl, R′ is selected from hydrogen and lower alkyl, and R and R′ may be joined together to form a morpholido ring, and $n$ is 1 or 2.

2. A method as in claim 1 in which $n$ is 2.
3. A method as in claim 1 in which R′ is hydrogen and R is an aryl group consisting of a substituted phenyl in which the substituent is selected from:
   (a) 1 or 2 alkyl groups
   (b) 1 or 2 alkoxy groups
   (c) 1 to 3 chlorine atoms.
4. A method as in claim 3 in which $n$ is 2.
5. A method as in claim 4 in which the said substituent is alkyl.
6. A method as in claim 4 in which the said substituent is chlorine.
7. A method as in claim 1 in which the chemical is 2,3-dihydro-5-carboxanilido - 6 - methyl-1,4-oxathiin-4,4-dioxide.
8. A method as in claim 1 in which the chemical is 2,3-dihydro - 5 - (N-cyclohexylcarboxamido)-6-methyl-1,4-oxathiin-4,4-dioxide.
9. A method as in claim 1 in which the chemical is a 2,3-dihydro - 5 - (N-alkylcarboxamido)-6-methyl-1,4-oxathiin-4,4-dioxide.
10. A method as in claim 1 in which the chemical is a 2,3-dihydro - 5 - (N-alkylphenylcarboxamido)-6-methyl-1,4-oxathiin-4-oxide.

References Cited

UNITED STATES PATENTS

| 2,338,516 | 1/1944 | Kern et al. | 260—327 |
| 2,991,292 | 7/1961 | Degener et al. | 260—327 |
| 3,249,499 | 5/1966 | Von Schmeling et al. | 167—33 |

LEWIS GOTTS, *Primary Examiner.*

S. K. ROSE, *Assistant Examiner.*